United States Patent
Zhou

(10) Patent No.: US 11,218,667 B2
(45) Date of Patent: Jan. 4, 2022

(54) INTELLIGENT CONFERENCE PROJECTION SYSTEM

(71) Applicant: DALIAN CZUR TECH CO., LTD, Liaoning (CN)

(72) Inventor: Kang Zhou, Liaoning (CN)

(73) Assignee: DALIAN CZUR TECH CO., LTD., Dalian (CN)

( * ) Notice: Subject to any disclaimer, the term of this patent is extended or adjusted under 35 U.S.C. 154(b) by 0 days.

(21) Appl. No.: 17/201,395

(22) Filed: Mar. 15, 2021

(65) Prior Publication Data

US 2021/0203881 A1    Jul. 1, 2021

Related U.S. Application Data

(63) Continuation-in-part of application No. PCT/CN2019/103152, filed on Aug. 29, 2019.

(30) Foreign Application Priority Data

Sep. 14, 2018 (CN) .......................... 201811075314.2

(51) Int. Cl.
| | |
|---|---|
| H04N 7/15 | (2006.01) |
| H04N 7/14 | (2006.01) |
| G06F 3/0354 | (2013.01) |
| G06F 3/038 | (2013.01) |
| H04N 9/31 | (2006.01) |
| H04W 4/80 | (2018.01) |
| G10L 15/22 | (2006.01) |
| H04W 84/12 | (2009.01) |

(52) U.S. Cl.
CPC ............. *H04N 7/147* (2013.01); *G06F 3/038* (2013.01); *G06F 3/03547* (2013.01); *H04N 7/15* (2013.01); *H04N 9/31* (2013.01); *G06F 2203/0384* (2013.01); *G10L 15/22* (2013.01); *H04W 4/80* (2018.02); *H04W 84/12* (2013.01)

(58) Field of Classification Search
CPC ............ H04N 7/14; H04N 7/15; H04N 7/147; H04N 7/152; H04N 9/31; G06F 3/0354; G06F 3/038
USPC .......................................... 348/14.01–14.16
See application file for complete search history.

(56) References Cited

U.S. PATENT DOCUMENTS 7,057,635 B1 *  6/2006  Naden ...................... H04N 5/74
                                                     345/169
9,374,554 B1 *  6/2016  Poulad ............... H04N 5/23238
(Continued)

FOREIGN PATENT DOCUMENTS

| CN | 1605070 A | 4/2005 |
|---|---|---|
| CN | 201717985 U | 1/2011 |

(Continued)

*Primary Examiner* — Melur Ramakrishnaiah
(74) *Attorney, Agent, or Firm* — Novick, Kim & Lee, PLLC; Allen Xue

(57) ABSTRACT

An intelligent conference projection system includes a on-site master control system, and a conference system and an auxiliary system connected with the on-site master control system by signal connection. The conference system has a conference initiation module, a video communication module and an automatic incoming call projection awaking module. The auxiliary system includes a wireless transmission screen subsystem, a voice receiving and recognizing subsystem and a dual-mode touchpad subsystem.

6 Claims, 2 Drawing Sheets

(56) References Cited

U.S. PATENT DOCUMENTS

| | | | |
|---|---|---|---|
| 9,407,862 B1 | 8/2016 | Jawad et al. | |
| 2014/0176664 A1* | 6/2014 | Wu | H04N 7/15 |
| | | | 348/14.07 |
| 2015/0181545 A1 | 6/2015 | Zhao et al. | |

FOREIGN PATENT DOCUMENTS

| | | |
|---|---|---|
| CN | 103458221 A | 12/2013 |
| CN | 104717450 A | 6/2015 |
| CN | 205754615 U | 11/2016 |
| CN | 106534818 A | 3/2017 |
| CN | 206060790 U | 3/2017 |
| CN | 107172382 A | 9/2017 |
| CN | 207099091 U | 3/2018 |
| CN | 207744059 U | 8/2018 |
| CN | 109068087 A | 12/2018 |
| WO | 2003034235 A1 | 4/2003 |

\* cited by examiner

INTELLIGENT CONFERENCE PROJECTION SYSTEM

FIELD OF THE INVENTION

The present disclosure relates to the technical field of projector, in particular to an intelligent conference projection system.

BACKGROUND

At present, the wireless projection screen used in the common teleconference system occupies the bandwidth of the routing and network server, leading to the competition for broadband with the network video and lagging in an ordinary network environment. During the multi-party remote video conference, due to the limitation of network bandwidth and system hardware and software, not only the lag will be more obvious, but also bring great inconvenience to the relevant operation and system use. When using the wireless projection function, the file can only be operated on the computer, but cannot be modified directly in the projection screen. Projection screen users cannot quickly modify the file according to the conference discussion.

Besides, when using projection equipment for teleconference, remote control is usually used for operation, which is not convenient for the operation of office documents and does not conform to the operation habits of most people, thus affecting the work efficiency.

SUMMARY OF THE INVENTION

According to the problem of the projection occupying the network resources, the present disclosure provides an intelligent conference projection system. The present disclosure utilizes the built-in double WiFi of the projector for PC files transfer and projection screen respectively, so as to work through an independent network channel without affecting by routing and public local area network environment.

The technical solutions adopted in the present disclosure are as follows:

An intelligent conference projection system includes an on-site master control system, and a conference system and an auxiliary system connected with the on-site master control system by signal connection, wherein:

The conference system includes a conference initiation module, a video communication module and an automatic incoming call projection awaking module.

The auxiliary system includes:

A wireless transmission screen subsystem adapted to control conference content projection and teleconference pictures;

A voice receiving and recognizing subsystem adapted to obtain a conference audio signals; and A dual-mode touchpad subsystem adapted to change projected files and quickly switching between a keyboard mode and a mouse mode;

The master control system is adapted to, when actively initiating a conference, send a conference initiating signal to the remote via the Internet by means of the conference initiating module, and, after receiving a response signal from the remote, start the video communication module to establish the teleconference connection;

The master control system is further adapted to, when passively answering a conference, automatically awake the projection system by means of the automatic incoming call projection awaking module and establish the teleconference connection by means of the video communication module; and The on-site master control system is adapted to, when the conference projection system is in operation, control the auxiliary system to work cooperatively, that is, to control the wireless transmission screen subsystem to project the conference files through the projector, control the voice receiving and recognizing subsystem to obtain conference audio signals, and control the dual-mode touchpad subsystem to switch autonomously between the two working modes according to needs.

Further, the wireless transmission screen subsystem includes a projector and an emitter.

The projector is provided with a built-in projection WiFi hotspot and a built-in file transfer WiFi hotspot; the projector is adapted to receive a two-dimensional content obtained by the emitter, the emitter adapted to access a PC via USB connection through the projection WiFi hotspot, and receive the text files through the file transfer WiFi hotspot.

Further, the dual-mode touchpad subsystem includes a touchpad, a built-in power supply, a Bluetooth communication module, an automatic charging module and a mode switching module.

The touchpad is adapted to connect with the on-site master control system by signal connection through the Bluetooth communication module to control the projection mode of the system;

The automatic charging module is adapted to, when detecting that the touchpad is not in a working state and is placed in a designated charging position, charge the touchpad automatically; and The touchpad is adapted to, when working in a mouse mode and upon the mode switching module detecting that a projection cursor enters a modifiable textbox area in the projection content, switch the touchpad to the keyboard mode automatically.

Further, the projector is provided with a touch connection port for connecting the touchpad; the projector is adapted to, when the on-site master control system detects that the touchpad is connected to the touch connection port, control the automatic charging module to charge the touchpad; and, when the on-site master control system detects that the touchpad is not connected to the touch connection port, and controlling the automatic awaking module to start the projection system.

Further, the voice receiving and recognizing subsystem includes a microphone pickup array and a voice recognizing and converting unit; the microphone pickup array is adapted to generate conference speech audio files and send them to the voice recognizing and converting unit; and the voice recognizing and converting unit is adapted to convert the audio files to the corresponding text files using a voice recognizing algorithm.

Further, the intelligent conference projection system includes a memory cell storing the audio files picked up by the voice receiving and recognizing subsystem and text files generated automatically.

Compared with the prior art, the present disclosure has the following advantages:

1. The present disclosure can effectively reduce the synchronization lag between the projection display and the computer image caused by insufficient bandwidth of the router or network server.

2. The present disclosure can realize the automatic awaking function of the projection equipment, and the projection equipment can be automatically closed after the touchpad is put back to the designated position, and automatically charge the touchpad, so as to improve the intelligence of the equipment, avoid missing the video conference, and do not need other communication methods to notify the opening of the projection to enter the video conference.

3. When the touchpad operates the cursor in the mouse mode to enter the text input box area, automatically switching to the keyboard mode to facilitate the operator to modify the file directly.

Based on the above reasons, the present disclosure can be widely used in teleconferences of various sizes.

BRIEF DESCRIPTION OF THE DRAWINGS

In order to more clearly illustrate the embodiments of the present disclosure or the technical solutions in the prior art clearer, the drawings required in the description of the embodiments or the prior art will be briefly introduced below. Obviously, the drawings in the following descriptions are some embodiments of the present disclosure. For those of ordinary skilled in the art, other drawings can be obtained based on these drawings without inventive effort.

DETAILED DESCRIPTION OF THE INVENTION

It should be noted that, the embodiments and the characteristics in the embodiments of the present disclosure can be combined with each other without conflict. The present disclosure will be illustrated in detail by referring to the accompany drawings combining with the embodiments.

To make the objective, technical solutions and advantages of the present disclosure clearer, a clear and complete description of the embodiments in the present disclosure may be given herein after in combination with the accompany drawings of the embodiment. Obviously, the embodiments described below are part embodiments of the present disclosure, not all of them. The following description of at least one embodiment is in fact only illustrative and is in no way as a limitation on the present disclosure and its application or use. Based on the embodiments in the present disclosure, all other embodiments obtained by those skilled in the art without inventive effort are within the protection scope of the present disclosure.

Figure 1:
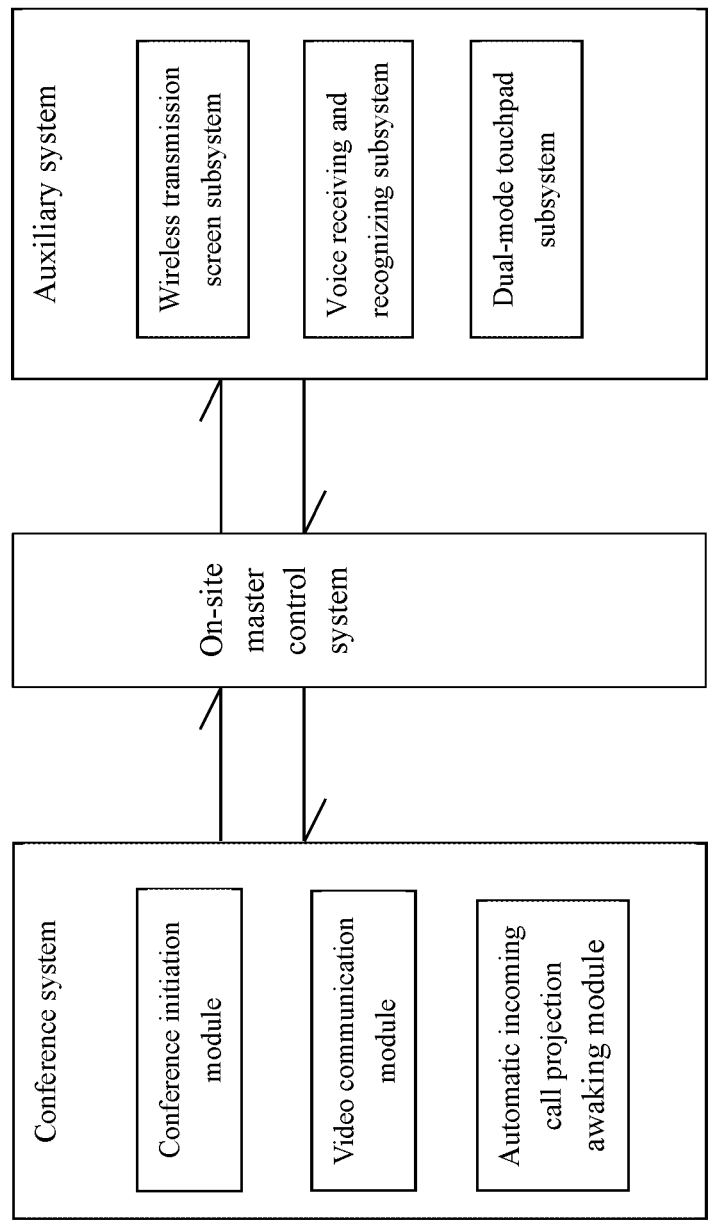
FIG. 1 is a system structure diagram of the present disclosure.

As shown in FIG. 1, the present disclosure provides an intelligent conference projection system, which is based on the common teleconference facilities or projection equipment or other equipment that can realize live large screen demonstration and remote real-time communication in the current office space.

The intelligent conference projection system includes an on-site master control system, and a conference system and an auxiliary system connected with the on-site master control system by signal connection. The on-site master control system is a computing system based on embedded platform such as Arm or X86. The operating system can be any suitable operating system, such as Linux or Android.

The conference system is used for realizing the teleconference functions, including at least remote call, video call and file transfer, specifically including a conference initiation module, a video communication module and an automatic incoming call projection awaking module. The conference initiation module is realized by software. Some of the software of the conference initiation module runs on the projector (i.e., terminal part) while the rest may run on a cloud server (i.e., cloud part). The projector contains a memory device, a CPU, a graphics processing unit (GPU), and a random-access memory. The storage device can be, but not limited to, a flash memory, or an embedded Multi-Media Controller (eMMC), etc. The operating system for the projector can be Linux, Android, or Windows, which loads and executes the software on the projector. The terminal part of the conference initiation module initiates the control of the user interaction while the cloud part is configured to realize the authorization and authentication and to return the data to the terminal part.

The video communication module also has a terminal part running on the projector and a cloud part running on a cloud server. The terminal part exercises control of audio hardware and image acquisition hardware connected to the projector, the encoding and decoding of audio data, and the network transmission while the cloud part is configured to realize the establish of the connection channel, the transmission and forwarding of data, and the control and optimizing of video communication quality. The cloud part also checks incoming calls and forwards them to the terminal part.

The automatic incoming call projection awaking module likewise contains a terminal part running on the projector and a cloud part running on a cloud server. The cloud part performs authentication of incoming calls and transfer of incoming calls to the terminal part, which monitors incoming calls and wakes up the projector.

The auxiliary system mainly includes a wireless transmission screen subsystem realizing an interaction of conference content projection and teleconference pictures, a voice receiving and recognizing subsystem realizing conference audio pickup, and a dual-mode touchpad subsystem changing the projection files and quickly switching between a keyboard mode and a mouse mode. The wireless transmission screen subsystem includes a projector and an emitter; the projector is provided with a built-in projection WiFi hotspot and a built-in file transfer WiFi hotspot, through the projection WiFi hotspot. The WiFi hotspot is provided by independent WiFi chip such as RTL8723DS. The emitter is a wireless connection emitter installed in PC, the operating system of PC including, without limitation, MAC and Windows. The projector is adapted to receive a two-dimensional content obtained by the emitter, the emitter adapted to access a PC via USB connection through the projection WiFi hotspot, and receive the text files through the file transfer WiFi hotspot. The dual-mode touchpad subsystem includes a touchpad, a built-in power supply, a Bluetooth communication module, an automatic charging module and a mode switching module. An exemplary Bluetooth communication module is a touchpad emitter based on BT chip, such as TLSR8251-E6 chip. The automatic charging module will be automatically triggered and start charging the touchpad when the touchpad is connected to the projector. The switching module based on the BT chip and enable the keyboard mode and the mouse mode switch to each other. The touchpad is connected with the on-site master control system by signal connection through the Bluetooth communication module to control the projection mode of the system; the automatic charging module detects that the touchpad is not in a working state and is placed in a designated charging position, and then the touchpad is automatically charged; the touchpad works in a mouse mode, when the mode switching module detects that a projection cursor enters a modifiable textbox area in the projection content, the touchpad is automatically switched to the Bluetooth keyboard mode, the keyboard background light on the surface of the touchpad lighting up, indicating that the keyboard mode has been switched to Bluetooth keyboard mode, at the same time, sending instructions to the on-site master control system to make it switch from the mouse mode to the keyboard mode and recognize it as Bluetooth keyboard state. Besides, the projector is provided with a touch connection port for placing the touchpad; the touch connection port is configured to connect the projector and the touchpad, including but not limited to contact type and plug-in type; when the on-site master control system detects that the touchpad is connected to the touch connection port, then the automatic charging module is controlled to charge the touchpad; and when the on-site master control system detects that the touchpad is not connected to the touch connection port, then the automatic awaking module is controlled to start the projection system. The voice receiving and recognizing subsystem includes a microphone pickup array and a voice recognizing and converting unit; the microphone pickup array is adapted to generate the conference speech audio files and send them to the voice recognizing and converting unit; and the voice recognizing and converting unit is adapted to convert the audio files to the corresponding text files using a voice recognizing algorithm. In addition, the system also includes a memory cell, which stores the audio files picked up by the voice receiving and recognizing subsystem and the automatically generated text files. The memory cell includes a terminal storage and a cloud storage. The terminal storage includes, without limitation, Flash, USB disk, EMMC and hard disk. The cloud storage is a memory space provided on server.

When actively initiating a conference, the master control system is adapted to send a conference initiating signal to the remote via the Internet by means of the conference initiating module, and, after receiving a response signal from the remote, start the video communication module to establish the teleconference connection. When the teleconference is connected, the camera on the projector will be automatically opened to collect the conference on-site images, simultaneously the voice receiving and recognizing subsystem be opened to collect the conference on-site audios and deal with the noise; the video signal and audio signal are simultaneously transmitted to the master control system for signal processing, and then the video and audio signal are transmitted to the parties of the conference connection through the network. The hardware solution of the voice receiving and recognizing subsystem is to use a plurality of noise reduced microphones, so that after collecting voice, it can directly reduce the noise, eliminate the background sound, and transmit the clean audio stream to the main system for semantic recognition.

When passively answering a conference, the master control system is adapted to automatically awake the intelligent conference projection system by means of the automatic incoming call projection awaking module and establish the teleconference connection by means of the video communication module.

When the conference projection system is in operation, the on-site master control system is adapted to control the auxiliary system to work cooperatively, that is, to control the wireless transmission screen subsystem to project the conference files through the projector, control the voice receiving and recognizing subsystem to obtain conference audio signals, and control the dual-mode touchpad subsystem to switch autonomously between the two working modes according to needs.

Figure 2:
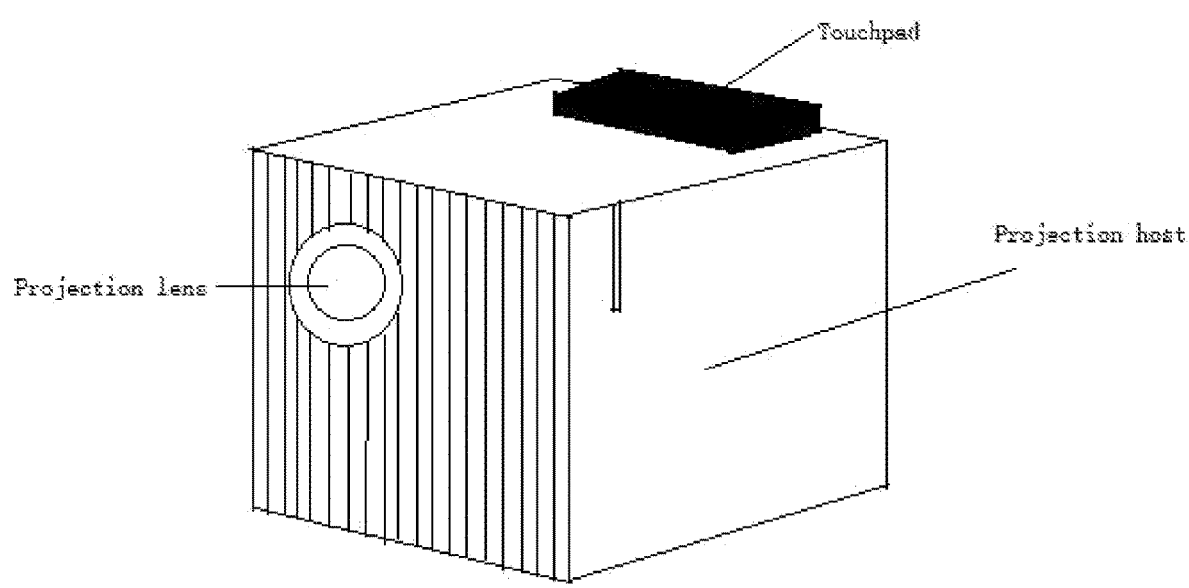
FIG. 2 is a schematic diagram of the combination of the projector and the touchpad of the present disclosure.

The technical solution of the present disclosure is further illustrated by an embodiment below:

FIG. 2 shows a projection apparatus carrying the intelligent conference projection system in the present disclosure, including a projector and a touchpad. The projector is provided with a projection lens, and integrates the main function units of the projector system, namely, the on-site master control system, the conference system and the auxiliary system. In one embodiment of the present disclosure, the internal of the projector also includes the pick-up microphone and a camera arranged on the back of the projection lens to take pictures of the conference place in the hardware structure. In a normal work mode of the conference projection system, the pick-up microphone is adapted to collect the voice message in the place, the camera is adapted to obtain the video message of the conference site; all the messages can be sent via the Internet to the remote, breaking the space barrier in the process of communication of the participants in the teleconference to the maximum extent, which is close to the direct face-to-face communication between people.

Corresponding to the intelligent conference system, the present disclosure also includes the intelligent projection function. The conference projection system actively initiates the conference to the remote; after receiving the remote response signal, the video communication module is started to establish the teleconference connection. The projector is automatically awakened, and the projection lens automatically projects the received remote images. At this time, the camera will be opened automatically to collect the conference site images, and the microphone will collect the conference site voice and transmit the audio and video signals to the parties connected to the conference through the network. When the file is needed to be demonstrated, the remote image will be reduced and the projector will automatically project the file, and the file content will be simultaneously transmitted to the connecting parties of the conference through the network. At this moment, the operator takes the touchpad off the projector, the dual-mode touchpad subsystem works automatically, and the projection main system controls the intelligent projection to automatically switch to the touchpad control mode. The touch mode of the touchpad is the mouse operation mode by default, whose operation mode is the same as that of a common laptop; the corresponding functions are realized by dragging, clicking, double-clicking and other operations, which will not be described here. When the cursor moves to the textbox area in the file, the touchpad switches the work mode from the mouse operation mode to the keyboard input mode; at this time, the keyboard background light arranged on the touchpad lights up and the whole touchpad presenting the common computer keyboard, the operators touching the corresponding key area to input. The use effect is the same as the ordinary computer keyboard, and the user can preload different input method software according to the using habit.

When passively answering the conference, the operation of each function part is similar to that when initiating a conference.

The present disclosure combines the remote video conference system with the intelligent projection system, which not only realizes the automatic awaking function of the projection equipment and improves the user experience of the participants, but also uses the dual-mode touchpad to instead of the remote control of the traditional projection system, autonomously switching between the mouse control mode and keyboard control mode on the premise of realizing the projection system control, so as to achieve the convenient file modification, more in line with the habits of most people and having better operation experience. When the touchpad is put back to the designated position, the projection equipment is automatically closed and automatically charges the touchpad, which improves the intelligent level of the equipment, avoids missing the video conference, and does not need other communication methods to inform to open the projection and enter the video conference.

Finally, it should be noted that the above embodiments are only used to illustrate the technical solutions of the present disclosure without limiting; although the present disclosure is described in detail with reference to some embodiments, the ordinary skilled in the art should understand that they may still make amendments to the technical solutions disclosed in the embodiments, or make equal replacements for some or all of their technical characteristics; these amendments or replacements do not remove the essence of the corresponding technical solutions from the scope of the technical solutions of the present disclosure.

The invention claimed is:

1. An intelligent conference projection system, comprising an on-site master control system, and a conference system and an auxiliary system connected with the on-site master control system by signal connection, wherein:
   the conference system comprises a conference initiation module, a video communication module, and an automatic incoming call projection awaking module;
   the auxiliary system comprises:
   a wireless transmission screen subsystem adapted to control conference content projection and teleconference pictures;
   a voice receiving and recognizing subsystem adapted to obtain a conference audio signal; and
   a dual-mode touchpad subsystem adapted to change projected files and switching between a keyboard mode and a mouse mode;
   wherein
   the on-site master control system is adapted to, when actively initiating a conference, send a conference initiating signal to a remote via Internet by means of the conference initiating module, and, after receiving a response signal from the remote, start the video communication module to establish a teleconference connection;
   the on-site master control system is further adapted to, when passively answering a conference, automatically awake the intelligent conference projection system by means of the automatic incoming call projection awaking module, and establish the teleconference connection by means of the video communication module; and
   the on-site master control system is adapted to, when the conference projection system is in operation, control the auxiliary system to work cooperatively so as to control the wireless transmission screen subsystem to project conference files through a projector, controlling the voice receiving and recognizing subsystem to obtain the conference audio signal, and control the dual-mode touchpad subsystem to switch autonomously between the keyboard mode and the mouse mode.

2. The intelligent conference projection system according to claim 1, wherein the wireless transmission screen subsystem comprises a projector and an emitter; and
   the projector is provided with a built-in projection WiFi hotspot and a built-in file transfer WiFi hotspot; the projector is adapted to receive a two-dimensional content obtained by the emitter, the emitter is adapted to access a PC via USB connection through the projection WiFi hotspot, and receive text files through the file transfer WiFi hotspot.

3. The intelligent conference projection system according to claim 2, wherein the dual-mode touchpad subsystem comprises a touchpad, a built-in power supply, a Bluetooth communication module, an automatic charging module, and a mode switching module;
   the touchpad is adapted to connect with the on-site master control system by signal connection through the Bluetooth communication module to control the projection mode of the on-site master system;
   the automatic charging module is adapted to, when detecting that the touchpad is not in a working state and is placed in a designated charging position, charge the touchpad automatically; and
   the touchpad is adapted to, when working in the mouse mode and upon the mode switching module detecting that a projection cursor enters a modifiable textbox area in the projection content, switch the touchpad to the keyboard mode automatically.

4. The intelligent conference projection system according to claim 3, wherein the projector is provided with a touch connection port for connecting with the touchpad; the projector is adapted to, when the on-site master control system detects that the touchpad is connected to the touch connection port, control the automatic charging module to charge the touchpad; and, when the on-site master control system detects that the touchpad is not connected to the touch connection port, the projector controls the automatic awaking module to start the projection system.

5. The intelligent conference projection system according to claim 1, wherein the voice receiving and recognizing subsystem comprises a microphone pickup array and a voice recognizing and converting unit; the microphone pickup array is adapted to generate the conference speech audio files and send them to the voice recognizing and converting unit; and the voice recognizing and converting unit is adapted to convert the audio files to corresponding text files using a voice recognizing algorithm.

6. The intelligent conference projection system according to claim 5, further comprising a memory cell storing the audio files picked up by the voice receiving and recognizing subsystem and text files generated automatically.

* * * * *